United States Patent
Carr (12)

(10) Patent No.: US 10,724,473 B2
(45) Date of Patent: Jul. 28, 2020

(54) SYSTEM INCLUDING TELESCOPING HIDDEN DRAG LINK ASSEMBLY FOR ACTUATING BLOCKER DOOR OF THRUST REVERSER

(71) Applicant: SPIRIT AEROSYSTEMS, INC., Wichita, KS (US)

(72) Inventor: Alexander Jon Carr, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 218 days.

(21) Appl. No.: 16/019,851

(22) Filed: Jun. 27, 2018

(65) Prior Publication Data

US 2020/0003151 A1  Jan. 2, 2020

(51) Int. Cl.
| | |
|---|---|
| *F02K 1/56* | (2006.01) |
| *B64D 33/04* | (2006.01) |
| *F02K 1/76* | (2006.01) |

(52) U.S. Cl.
CPC .............. *F02K 1/563* (2013.01); *B64D 33/04* (2013.01); *F02K 1/763* (2013.01); *F05D 2220/323* (2013.01); *F05D 2240/128* (2013.01)

(58) Field of Classification Search
CPC .......... F02K 1/563; F02K 1/566; F02K 1/736; F02K 1/766; F02K 1/72; B44D 33/04
See application file for complete search history.

(56) References Cited

U.S. PATENT DOCUMENTS

| | | | | |
|---|---|---|---|---|
| 4,807,434 | A * | 2/1989 | Jurich | F02K 1/72 239/265.29 |
| 5,046,307 | A * | 9/1991 | Matta | F02K 1/70 60/226.2 |
| 2014/0027537 | A1* | 1/2014 | Binks | F02K 1/09 239/265.35 |
| 2014/0373506 | A1* | 12/2014 | Kusel | F02K 1/72 60/226.2 |
| 2015/0108249 | A1* | 4/2015 | James | F02K 1/62 239/265.19 |
| 2015/0267640 | A1* | 9/2015 | Gormley | F02K 1/72 239/265.19 |
| 2016/0076484 | A1* | 3/2016 | Vauchel | F02K 1/72 239/265.33 |
| 2017/0328304 | A1* | 11/2017 | Gormley | F02K 1/763 |
| 2018/0038313 | A1* | 2/2018 | Wawrzynek | F02K 1/72 |

* cited by examiner

*Primary Examiner* — Carlos A Rivera
(74) *Attorney, Agent, or Firm* — Hovey Williams LLP

(57) ABSTRACT

A system for actuating a blocker door of a thrust reverser, in which a drag link assembly is removed from the airflow through the engine during flight. The assembly couples the door to a sleeve so that translation of the sleeve between deployed and stowed positions moves the door to open and closed positions, respectively. The assembly includes a telescoping drag link having one end rotatably coupled with a drag link anchor and another end coupled with the door. During deployment and stowage, translation of the sleeve causes the door to move and the link to extend or collapse and rotate until it contacts a stop element of the anchor, and then rotate in the opposite direction as the door opens or closes, respectively. A channel may be provided in the door to accommodate the link. The anchor may include a spring which exerts a rotational force on the link.

20 Claims, 13 Drawing Sheets

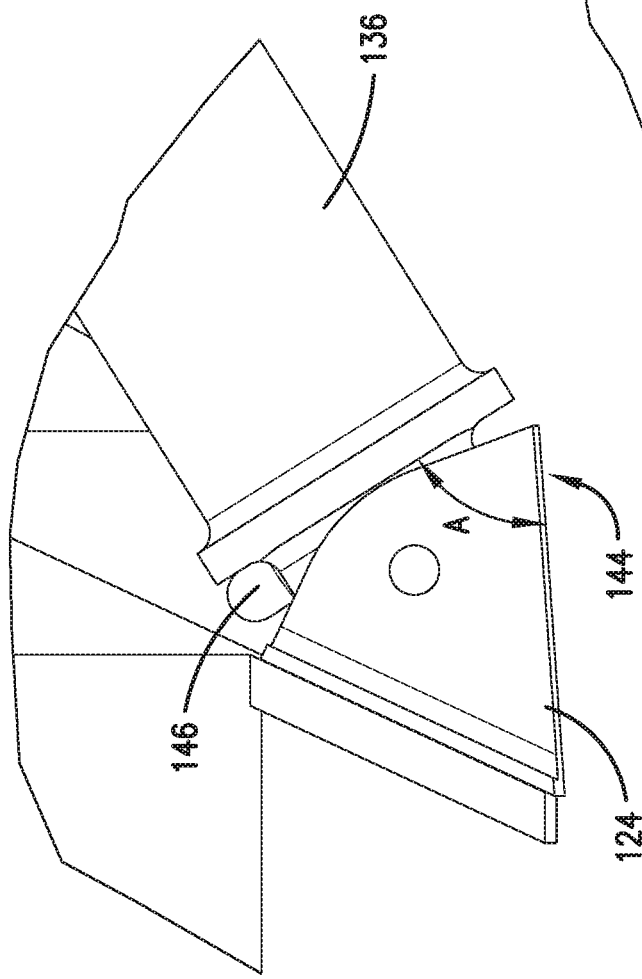
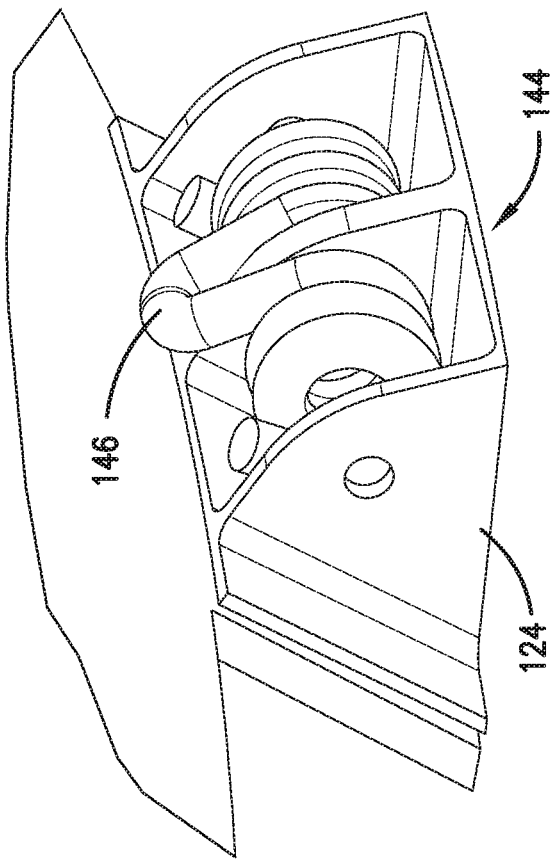

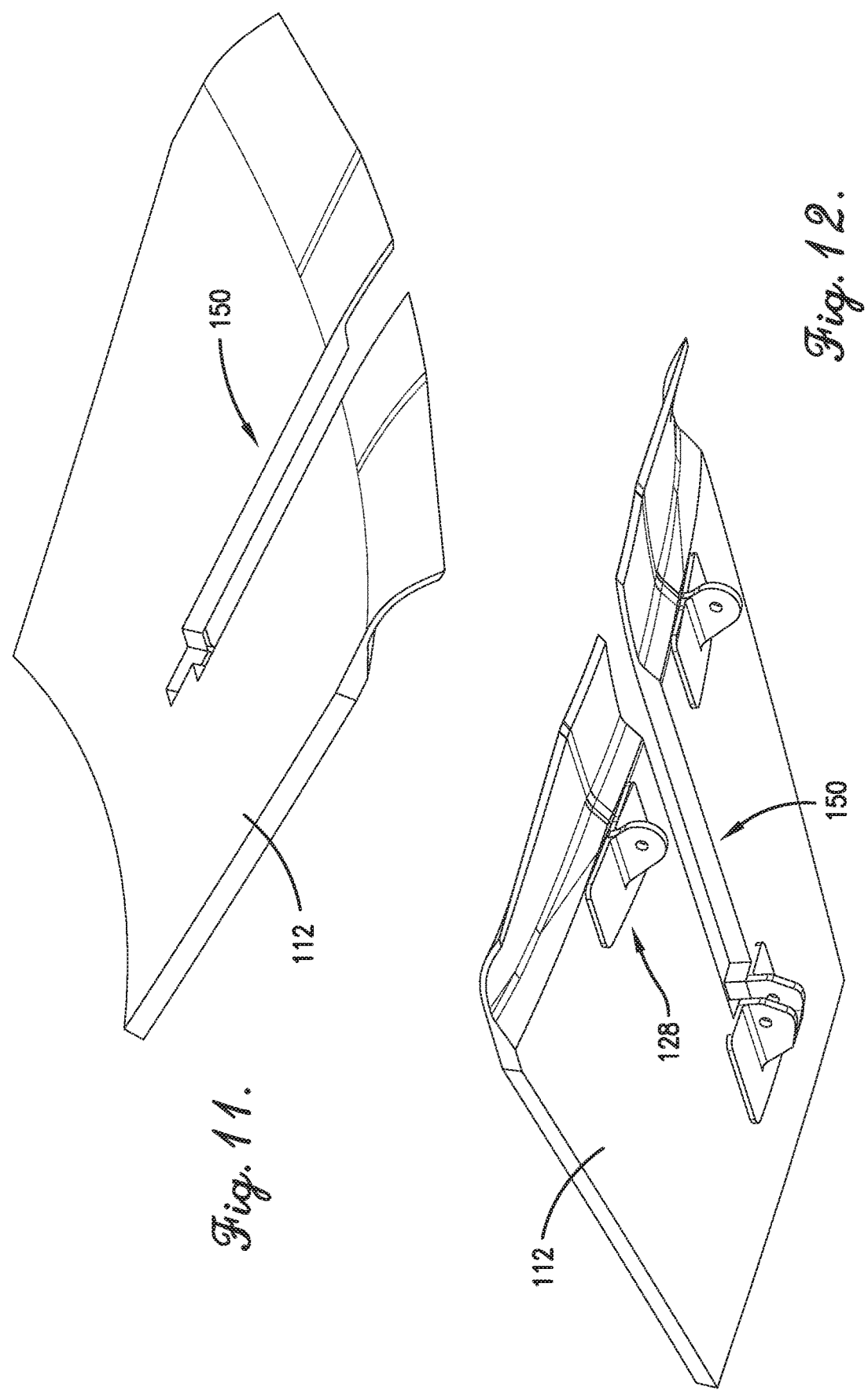

SYSTEM INCLUDING TELESCOPING HIDDEN DRAG LINK ASSEMBLY FOR ACTUATING BLOCKER DOOR OF THRUST REVERSER

FIELD

The present invention relates to thrust reversers for aircraft engines, and more particularly, embodiments concern a system including a hidden telescoping drag link assembly for actuating a blocker door of a translating sleeve thrust reverser, wherein the hidden telescoping drag link assembly stows within a space between the sleeve and the blocker door so as to be removed from the airflow through the engine and thereby reduce drag during flight.

BACKGROUND

Translating sleeve thrust reversers incorporate cascade assemblies which include pluralities of cascade segments, or baskets, spaced circumferentially around the engine nacelles. Each cascade segment includes a plurality of spaced airflow-turning vanes defining a series of cells or air passages. As seen in FIG. 1 (PRIOR ART), when the thrust reverser 40 is in a stowed configuration, the cascade segments 42 are covered and air flows through and rearwardly out of the engine to provide forward thrust. As seen in FIG. 2 (PRIOR ART), when the thrust reverser 40 is in a deployed configuration, the cascade segments 42 are uncovered and at least a portion of the air flowing through the engine is redirected through and forwardly by the vanes of the cascade segments 42 to provide reverse thrust.

Blocker doors 44 are used to redirect the airflow through the cascade segments 42. A drag link 46 actuates each blocker door 44 between closed and open positions which respectively correspond to the stowed and deployed configurations of the thrust reverser 40. In operation, an actuator mounted to a torque box translates a sleeve 48 rearward, and hinges mounted to the sleeve 48 pull the blocker door 44 rearward. The drag link 46 rotates around a pivot point and pulls the blocker door 44 upward, and the blocker door 44 rotates on the hinges to the open position. A control link allows limited relative motion and maintains tension in the stowed configuration.

However, the drag link 46 for actuating the blocker door 44 is exposed to the airflow through the engine during all phases of flight, regardless of the stowed or deployed configuration of the thrust reverser 40, which results in undesired drag. In one prior art solution, a track is provided for the drag link, but this does not allow for adequate control of the airflow during transition. One challenge is to open the blocker door sufficiently early in the deployment of the thrust reverser to avoid increasing the total airflow area too quickly and potentially causing damage to the engine. Prior art attempts have been made to use a telescoping drag link, but these have failed to provide adequate control of the airflow during the transition periods. In particular, the blocker door will not begin to deploy and redirect the air until the telescopic mechanism is fully extended. Other prior art solutions include complex actuation mechanisms and/or multiple linkages that interact to provide better potential transient control, but these suffer from increased complexity. One way to altogether avoid these problems is to replace the translating sleeve with pivot doors, but the latter typically provides less reverser efficiency than the former.

This background discussion is intended to provide information related to the present invention which is not necessarily prior art.

SUMMARY

Embodiments address the above-described and other problems and limitations by providing a system including a hidden telescoping drag link assembly for actuating a blocker door of a translating sleeve thrust reverser, wherein the hidden telescoping drag link assembly stows within a space between the sleeve and the blocker door so as to be removed from the airflow through the engine and thereby reduce drag during flight.

In one embodiment, a system is provided for actuating a blocker door of a thrust reverser. The thrust reverser may include a sleeve translatable between a stowed position in which an engine airflow is directed rearwardly and a deployed position in which the engine airflow is redirected forwardly. The system may include a blocker door and a drag link assembly having a drag link and a drag link anchor. The blocker door may be moveable between a closed position associated with the stowed position of the sleeve and an open position associated with the deployed position of the sleeve and in which the engine airflow is redirected laterally by the blocker door. The drag link assembly may be located between the sleeve in the stowed position and the blocker door in the closed position and configured to mechanically couple the sleeve to the blocker door so that translation of the sleeve to the deployed position moves the blocker door to the open position and translation of the sleeve to the stowed position moves the blocker door to the closed position. The drag link may include a base section and a subsequent section collapsibly and extendably connected to the base section, with the base section including a first link end, and the subsequent section including a second link end rotatably coupled with the blocker door. The drag link anchor may be rotatably coupled with the first link end of the drag link, and the drag link anchor may include a stop element which limits the rotation of the drag link in a first direction about the drag link anchor.

During deployment of the translating sleeve thrust reverser, the sleeve may be translated aft to the deployed position, the blocker door may be pulled rearward, the drag link may extend while rotating in the first direction until the drag link contacts the stop element which may cause the drag link to rotate in a second direction to allow for continued translation of the sleeve, and as the drag link continues to extend while rotating in the second direction, the blocker door may rotate into the open position. During stowage of the translating sleeve thrust reverser, the sleeve may be translated forward to the stowed position, the blocker door may be pulled forward, the drag link may collapse while rotating in the second direction until the drag link contacts the stop element which may cause the drag link to rotate in the first direction to allow for continued translation of the sleeve, and as the drag link continues to collapse while rotating in the first direction, the blocker door may rotate into the closed position.

Various implementations of the above-described embodiment may include any one or more of the following additional or alternative features. The blocker door may include a channel through which the drag link passes during opening and closing of the door, and the system may include a seal element configured to seal the channel when the blocker door is in the closed position. The base section and the subsequent section of the drag link may be telescopically arranged such that the subsequent section is collapsed and received within the base section when the blocker door is in the closed position and the subsequent section is extended and projecting from the base section when the blocker door is in the open position. A fully extended length of the drag link may be between two and four times a fully collapsed length of the drag link. The subsequent section of the drag link may be coated with a non-abrasive coating. One or more of the base section and/or the subsequent section of the drag link may include a bumper. The drag link anchor may include a spring element configured to exert a force on the drag link which urges the drag link to rotate.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 9 is a fragmentary cross-sectional side elevation view of a drag link anchor component of the system of FIG. 3 showing a stop element;

FIG. 10 is a fragmentary perspective view of the drag link anchor component of FIG. 9 showing a spring element;

FIG. 11 is an isometric view of a first side of the blocker door of FIG. 3;

FIG. 12 is an isometric view of a second side of the blocker door of FIG. 11;

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, embodiments provide a system including a hidden telescoping drag link assembly for actuating a blocker door of a translating sleeve thrust reverser, wherein the hidden telescoping drag link assembly stows within a space between the sleeve and the blocker door so as to be removed from the airflow through the engine and thereby reduce drag during flight. Additionally, the blocker door itself may be hidden within a cavity in the sleeve, which further reduces drag. Broadly, during deployment and stowage, translation of the sleeve causes the door to move and the drag link to extend or collapse and rotate until it contacts a stop element of the drag link anchor, and then rotate in the opposite direction as the door opens or closes, respectively.

Embodiments advantageously remove, or "hide," the collapsed drag link assembly from the airflow through the engine. In commercial aircraft, this advantageously reduces drag of the internal duct flow, increases acoustic area by removing hard points on the inner wall of the thrust reverser for drag link anchors, is compatible with an O-duct configuration, and reduces reverser thrust loads on the inner wall. In business aircraft, this advantageously allows for using a cascade-type thrust reverser which provides higher efficiency than a pivot door-type thrust reverser, and reduces drag of the internal duct flow by eliminating the pit which is required with a pivot door-type thrust reverser.

Figure 1:
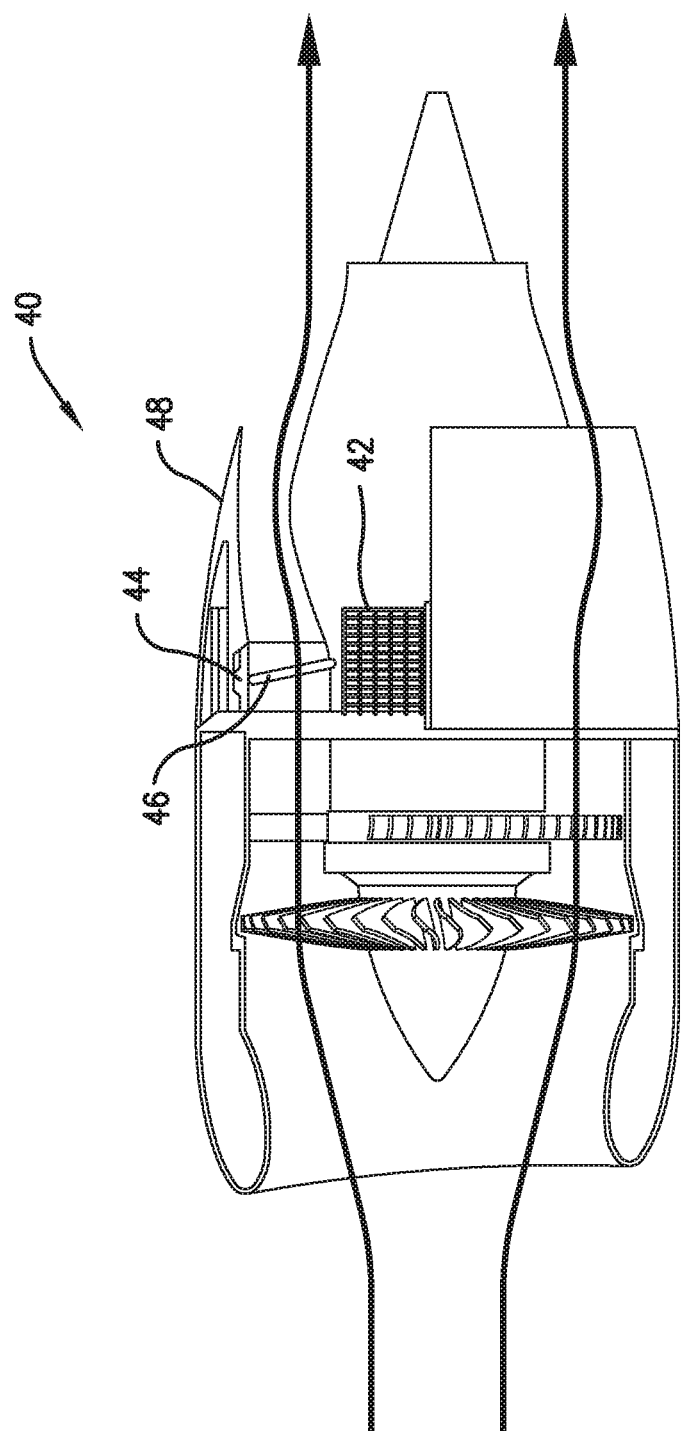
FIG. 1 (PRIOR ART) is a cross-sectional side elevation view of an aircraft engine having a translating sleeve thrust reverser in a stowed position, with an engine airflow directed rearwardly.
Figure 2:
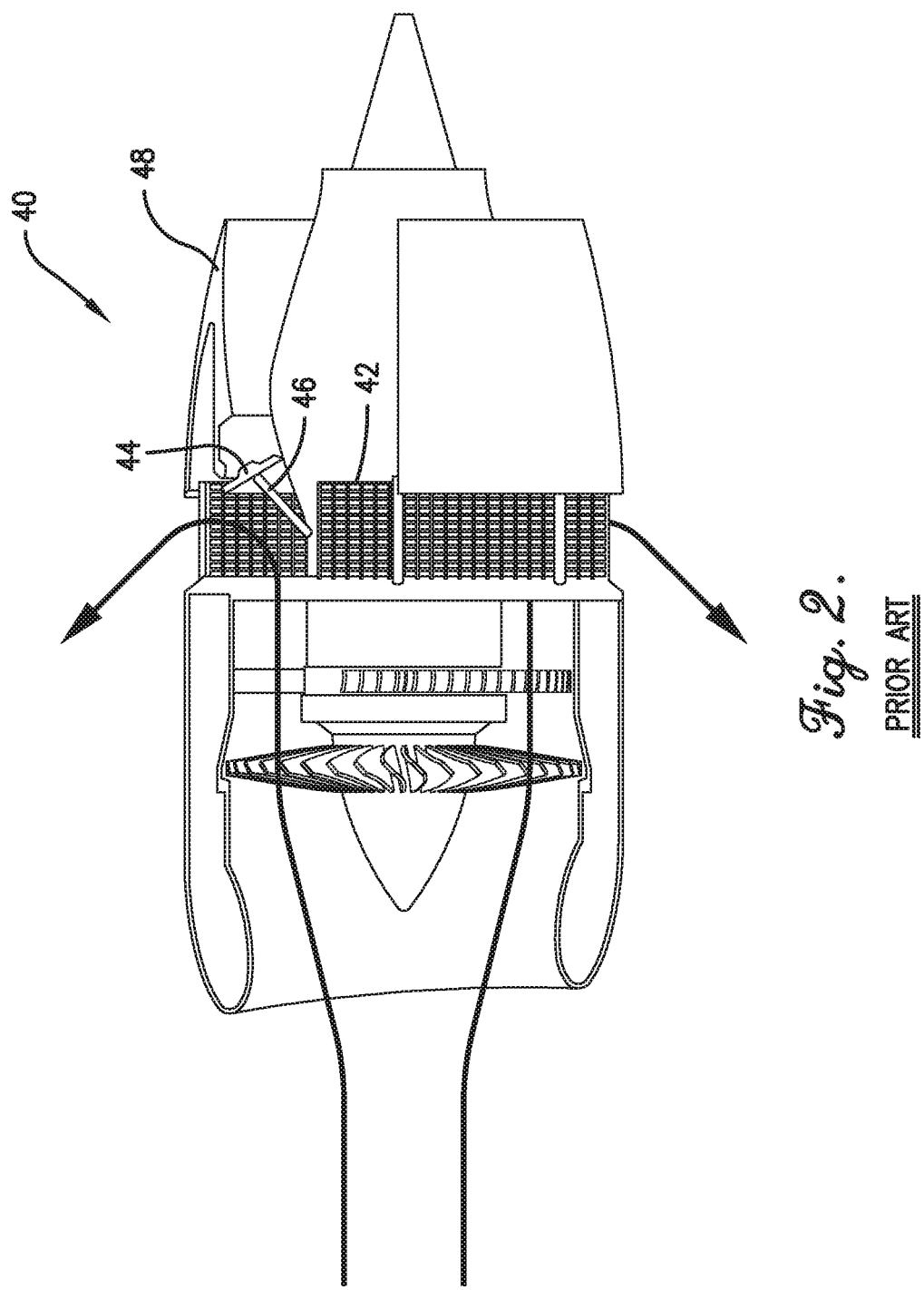
FIG. 2 (PRIOR ART) is a cross-sectional side elevation view of the aircraft engine of FIG. 1 (PRIOR ART) having the translating sleeve thrust reverser in a deployed position, with the engine airflow redirected forwardly.
Figure 3:
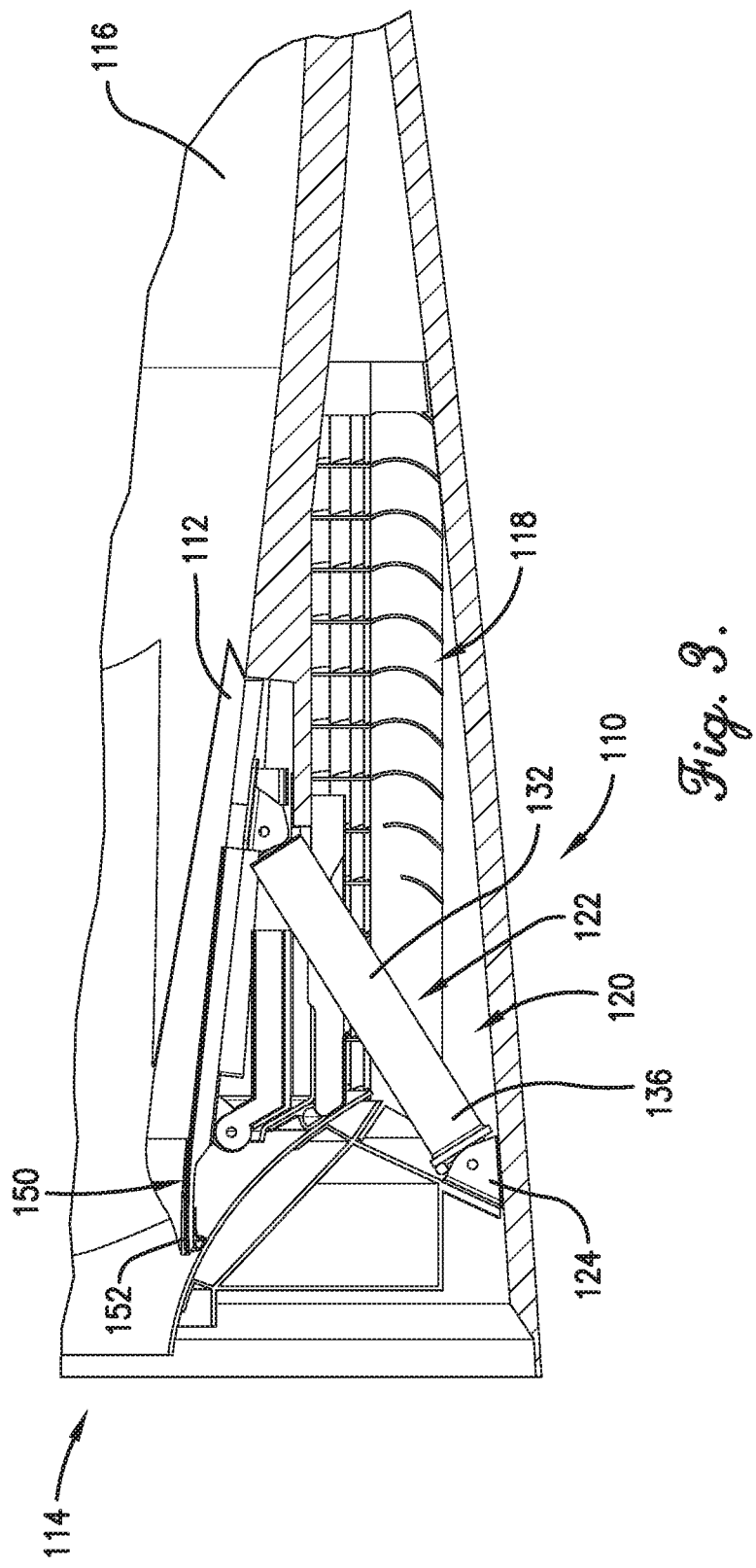
FIG. 3 is a fragmentary cross-sectional side elevation view of an embodiment of a system for actuating a blocker door of the translating sleeve thrust reverser, wherein the system includes a telescoping drag link assembly, and wherein a sleeve is shown in a stowed position and the blocker door is shown in a closed position.
Figure 4:
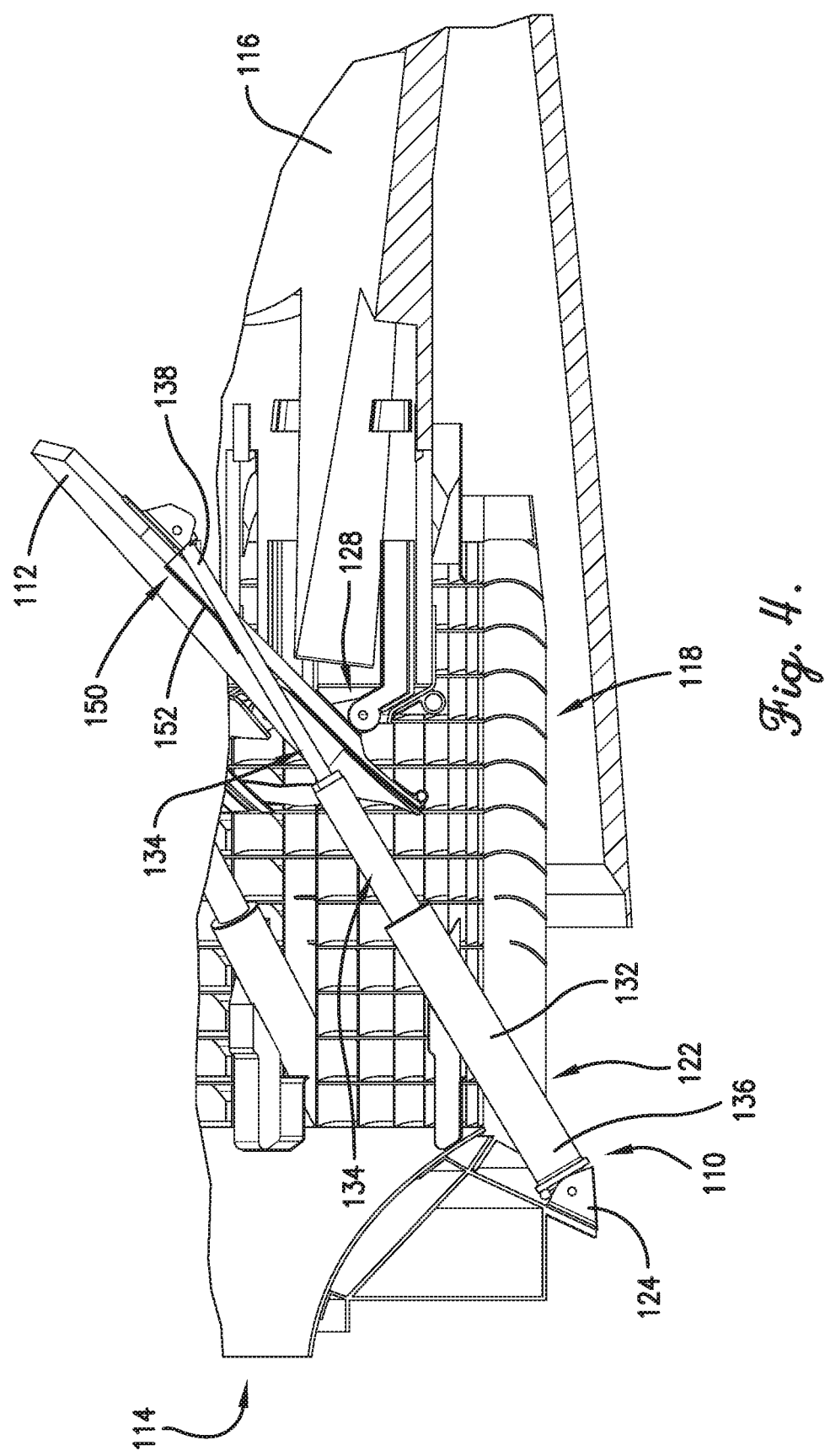
FIG. 4 is a fragmentary cross-sectional side elevation view of the system of FIG. 3, wherein the sleeve is shown in an intermediate position and the blocker door is shown in an intermediate position.
Figure 5:
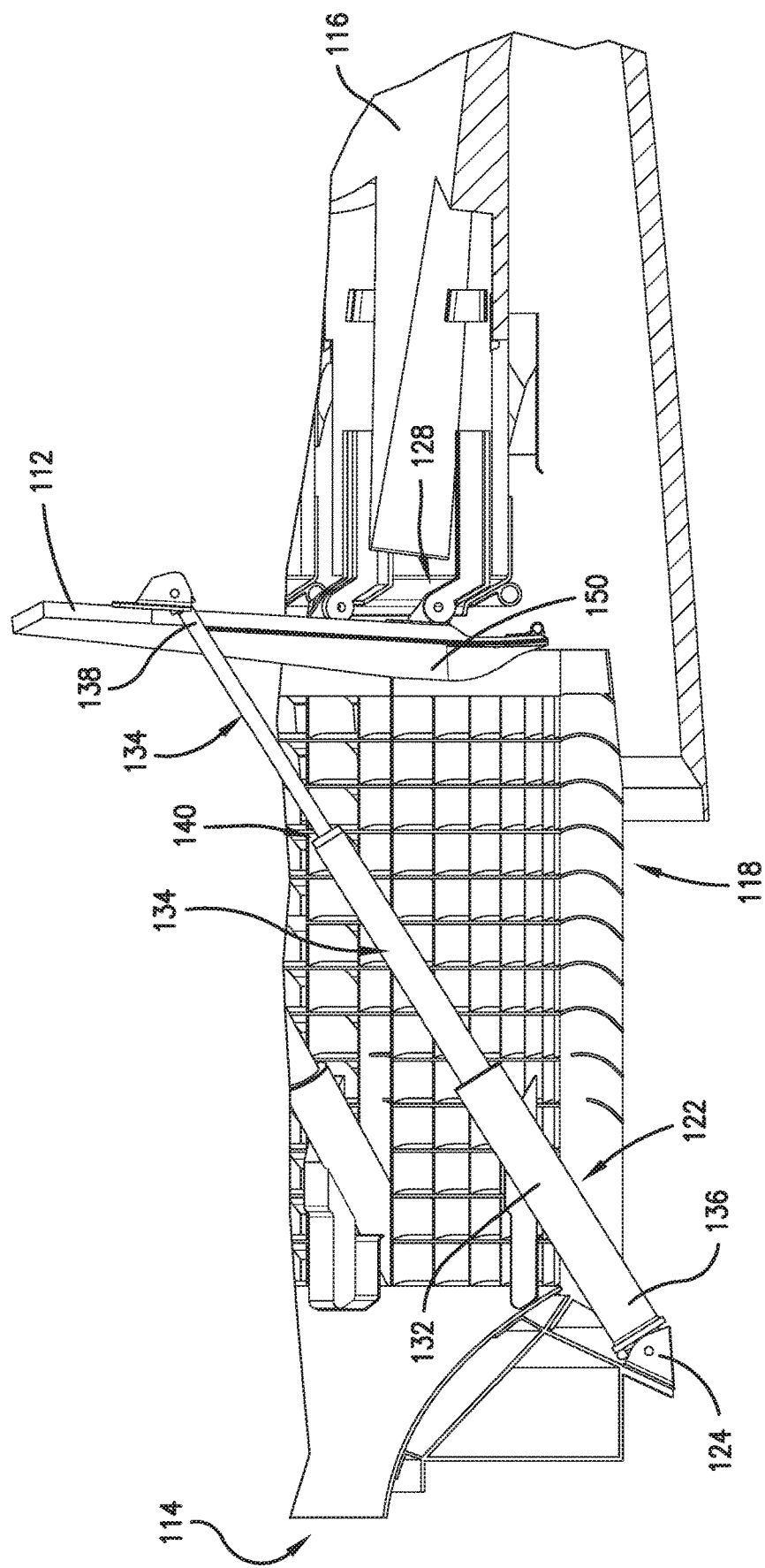
FIG. 5 is a fragmentary cross-sectional side elevation view of the system of FIG. 3, wherein the sleeve is shown in a deployed position and the blocker door is shown in an open position.
Figure 6:
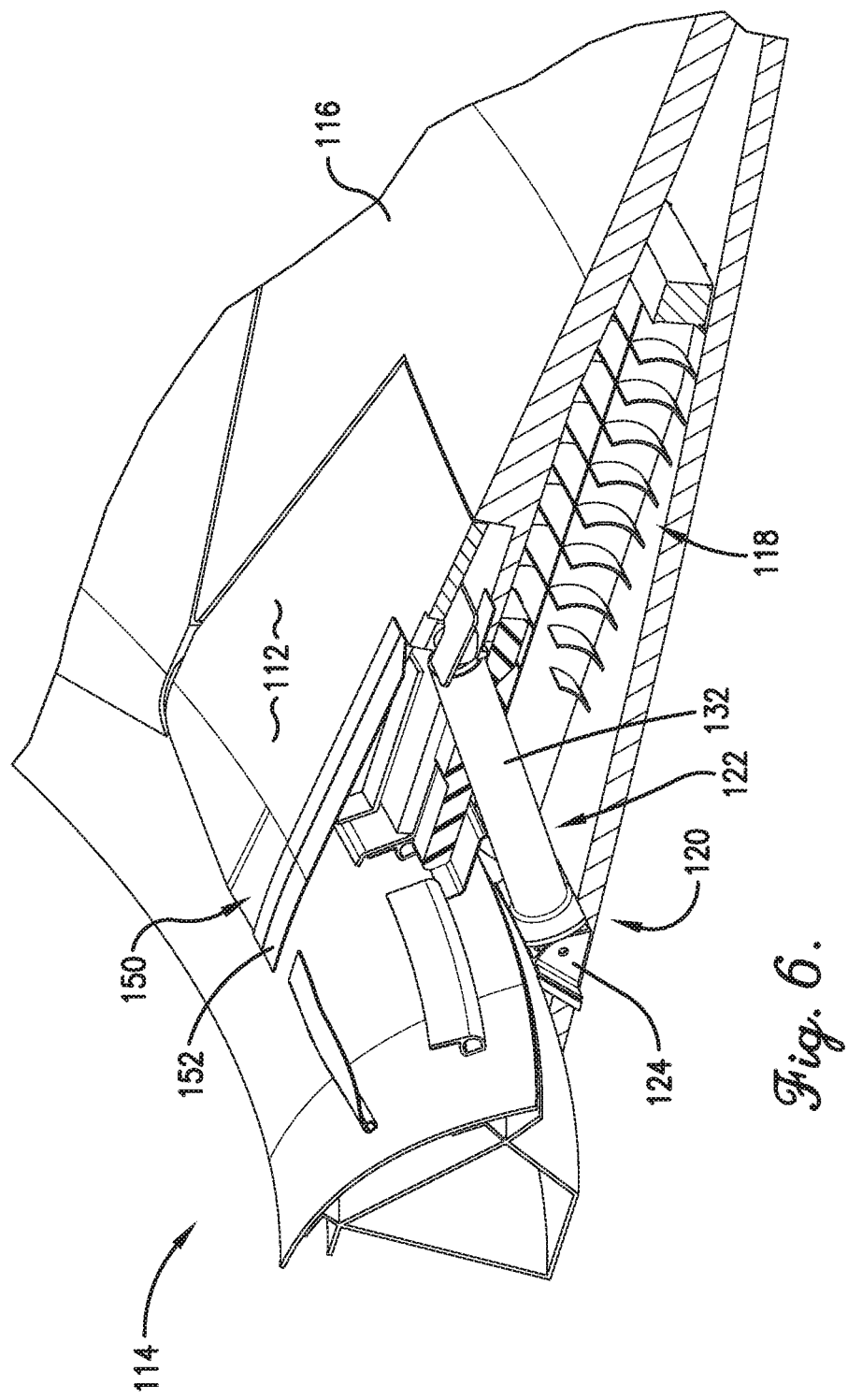
FIG. 6 is a fragmentary cross-sectional isometric view of the system of FIG. 3, wherein the sleeve is shown in the stowed position and the blocker door is shown in the closed position.
Figure 7:
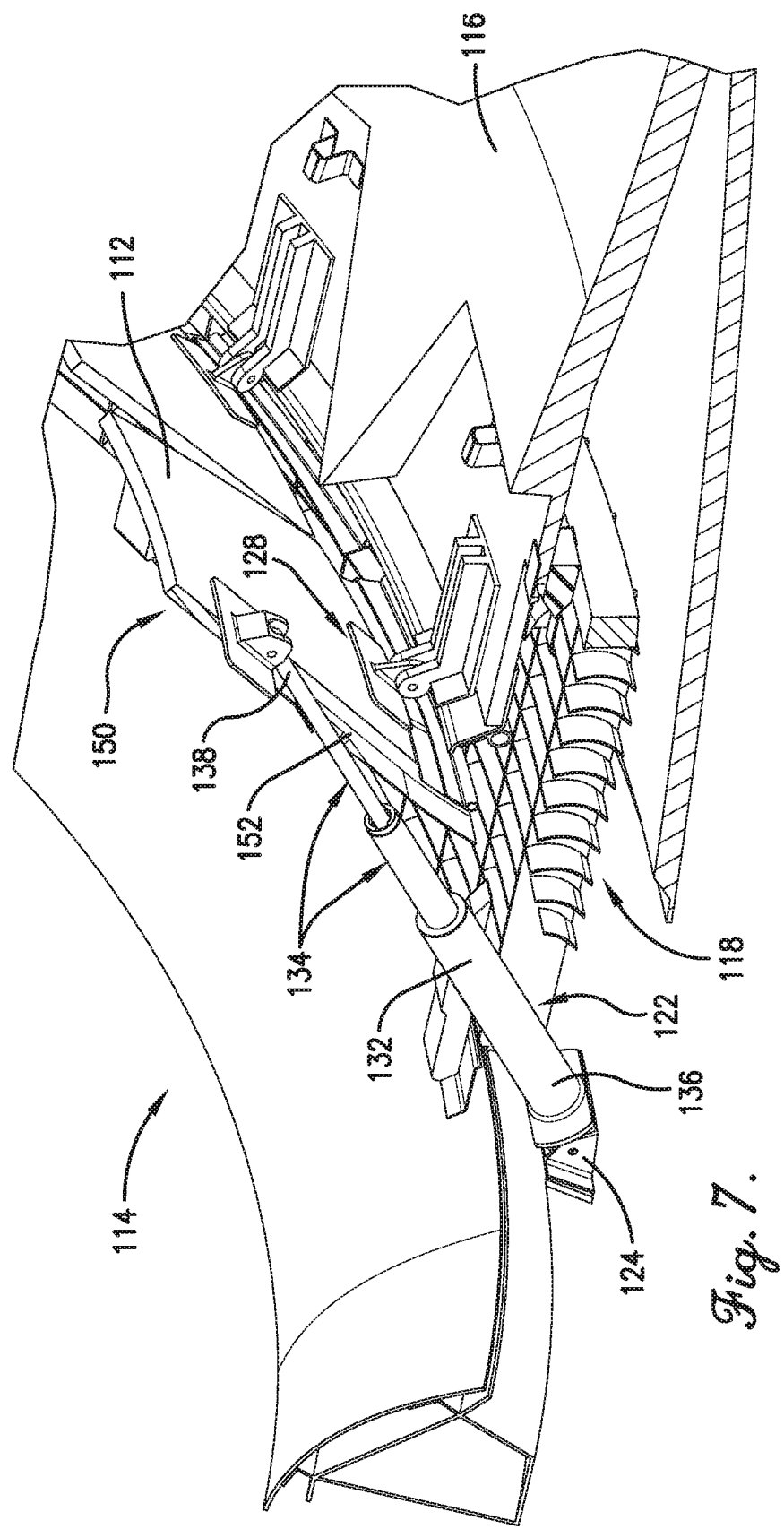
FIG. 7 is a fragmentary cross-sectional isometric view of the system of FIG. 3, wherein the sleeve is shown in the intermediate position and the blocker door is shown in the intermediate position.
Figure 8:
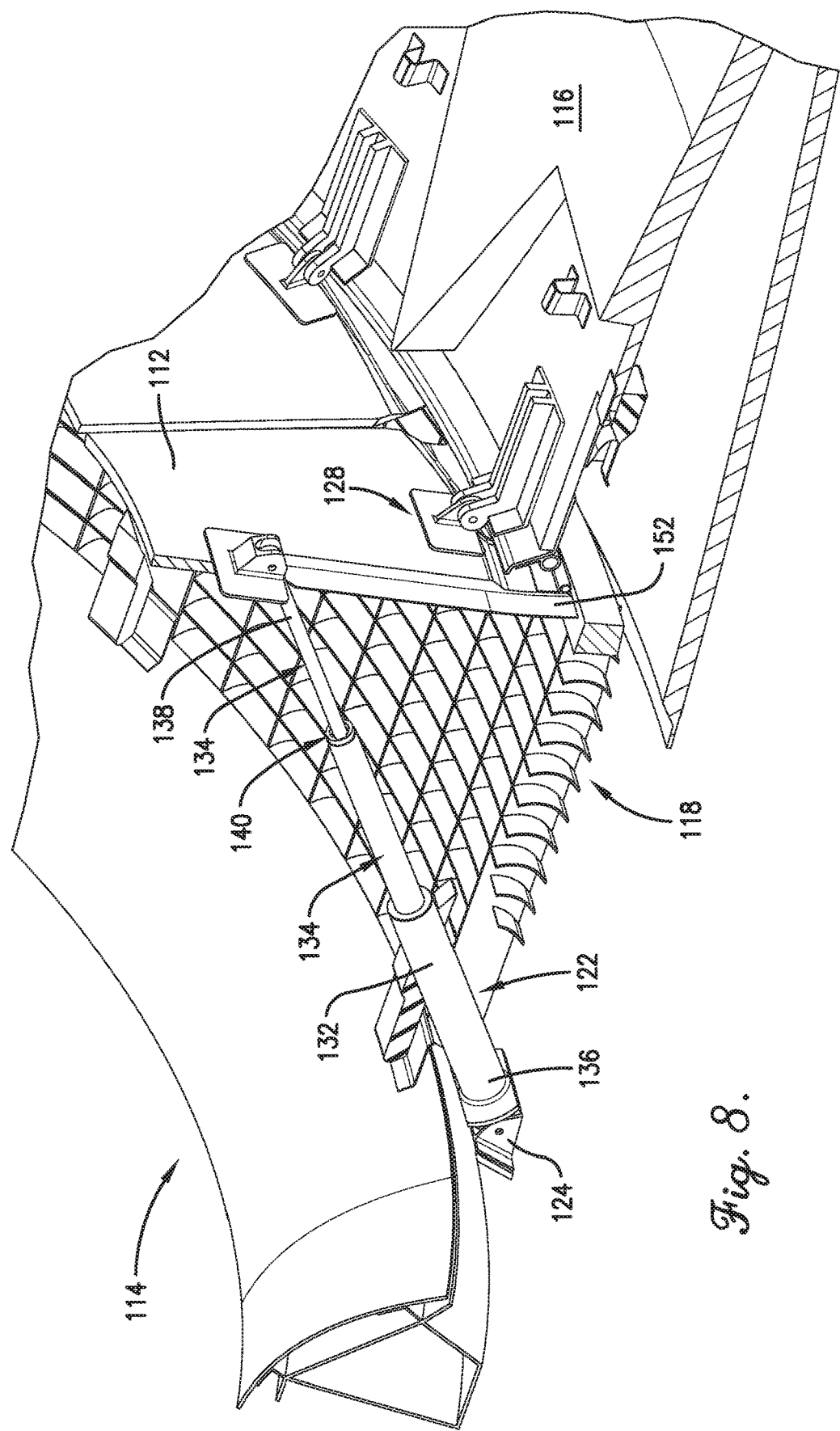
FIG. 8 is a fragmentary cross-sectional isometric view of the system of FIG. 3, wherein the sleeve is shown in the deployed position and the blocker door is shown in the open position.

Referring to FIGS. 3-12, a system 110 is shown for actuating a blocker door 112 of a translating sleeve thrust reverser 114 having a translatable sleeve 116 and a cascade assembly 118. Broadly, the system 110 may include one or more blocker doors 112 and a drag link assembly 120 including a drag link 122 and a drag link anchor 124. In general, the sleeve 116 and the cascade assembly 118 may incorporate substantially any suitable conventional or non-conventional technologies for redirecting engine airflow relatively forwardly during deployment of the thrust reverser 114. In particular, the sleeve 116 may be translatable, or moveable, between a stowed position in which the cascade assembly 118 is covered and air flows through and rearwardly out of the engine to provide forward thrust, and a deployed position in which the cascade assembly 118 is uncovered and at least a portion of the air flowing through the engine is redirected through and forwardly by the cascade assembly 118 to provide reverse thrust.

The blocker door 112 may be configured to redirect the engine airflow through the cascade assembly 118. More particularly, the blocker door 112 may be actuatable between a closed position (seen in, e.g., FIGS. 3 and 6), which corresponds to the stowed configuration of the sleeve 116, and an open position (seen in, e.g., FIGS. 5 and 8), which corresponds to the deployed configuration of the sleeve 116, and in which the blocker door 112 redirects the engine airflow through the cascade assembly 118. In one implementation, the blocker door 112 may be rotatably mounted by a hinge 128 to the sleeve 116, and rotatable about the hinge 128 between the open and closed positions. The design of the blocker door 112 may vary depending on the desires for or needs of particular applications, and therefore the blocker door 112 may have substantially any suitable shape and be constructed of substantially any suitable material or combination of materials.

The drag link assembly 120 may be generally located in a space, or cavity, between the stowed sleeve 116 and the closed blocker door 112. The drag link 122 of the drag link assembly 120 may include a base section 132 and one or more subsequent sections 134 collapsibly and extendably connected to the base section 132. The base section 132 may include a first link end 136, and the final subsequent section may include a second link end 138. The first link end 136 may rotatably couple with the drag link anchor 124, and the second link end 138 may rotatably couple with the blocker door 112.

In one implementation, the base and subsequent sections 132,134 may be telescopically arranged, with the subsequent sections 134 being collapsed and received within the base section 132 when the blocker door 112 is in the closed position, and being extended and projecting from the base section 132 when the blocker door 112 is in the open position. The fully extended length of the drag link 122 may vary depending on the desires for and needs of particular applications, but may be approximately between two and four times, or approximately three times, the length of the fully collapsed drag link 122. The cross-sectional shape of the drag link 122 may similarly vary, but in one implementation, may be approximately circular.

In one implementation, one or more of the subsequent sections 134 of the drag link 122 may be coated with a non-abrasive coating to reduce wear and/or binding during movement. In one implementation, one or more of the sections 132,134 of the drag link 122 may be provided with bumpers 140, such as when subject to close clearances or physical contact in one or more configurations. The bumpers 140 may be constructed of substantially any suitable material, such as rubber.

The drag link anchor 124 may be mounted to a torque box, though the mounting location may vary depending on the desires for and needs of particular applications, and may be rotatably coupled with the first link end 136 of the drag link 122. As seen in FIG. 9, the drag link anchor 124 may include a mechanical stop element 144 which limits the rotation of the drag link 122 in a first direction about the first link end 136. More particularly, during deployment, the drag link 122 may rotate in a first direction (e.g., clockwise) until it contacts the stop element 144, which causes the drag link to rotate in an opposite second direction (e.g., counterclockwise), which allows the door blocker door 112 to begin moving toward the open position. The stop element 144 forces the blocker door 112 to begin its rotation earlier in the deployment cycle and exhibit similar characteristics to standard drag link configurations. This allows more area match control during transition. Thus, the angle of rotation "A" at which the drag link 122 impinges upon the stop element 144 may determine the transient behavior of the blocker door 112, and this angle may vary depending on the desires for and needs of particular applications.

In one implementation, seen in FIG. 10, the drag link anchor 124 may include a spring element 146 configured to exert a force on the drag link 122, which urges the drag link 122 to rotate during deployment and stowage, and thereby aids in moving the blocker door 112 to the open and closed positions. In particular, the spring element 146 may urge rotation toward the stop element 144. Additionally or alternatively, the spring element 146 may urge rotation which is consistent with and/or facilitates continued translation of the sleeve 116.

As seen in FIGS. 11 and 12, the blocker door 112 may include a channel 150 through which the telescoping drag link 122 may pass during opening and closing of the blocker door 112. The channel 150 may be provided with a seal element 152 configured to seal the channel 150 when the blocker door 112 is in the closed position, while still allowing the drag link 122 to pass through the channel 150 during opening and closing of the door 112. In one implementation, the seal element 152 may include first and second overlapping flaps which allow the drag link 122 to pass between them.

The specific dimensions, shapes, mounting/connection positions, and/or other design considerations of the drag link 122 and/or drag link anchor 124 may be varied depending on the desires for or needs of particular applications.

Figure 13:
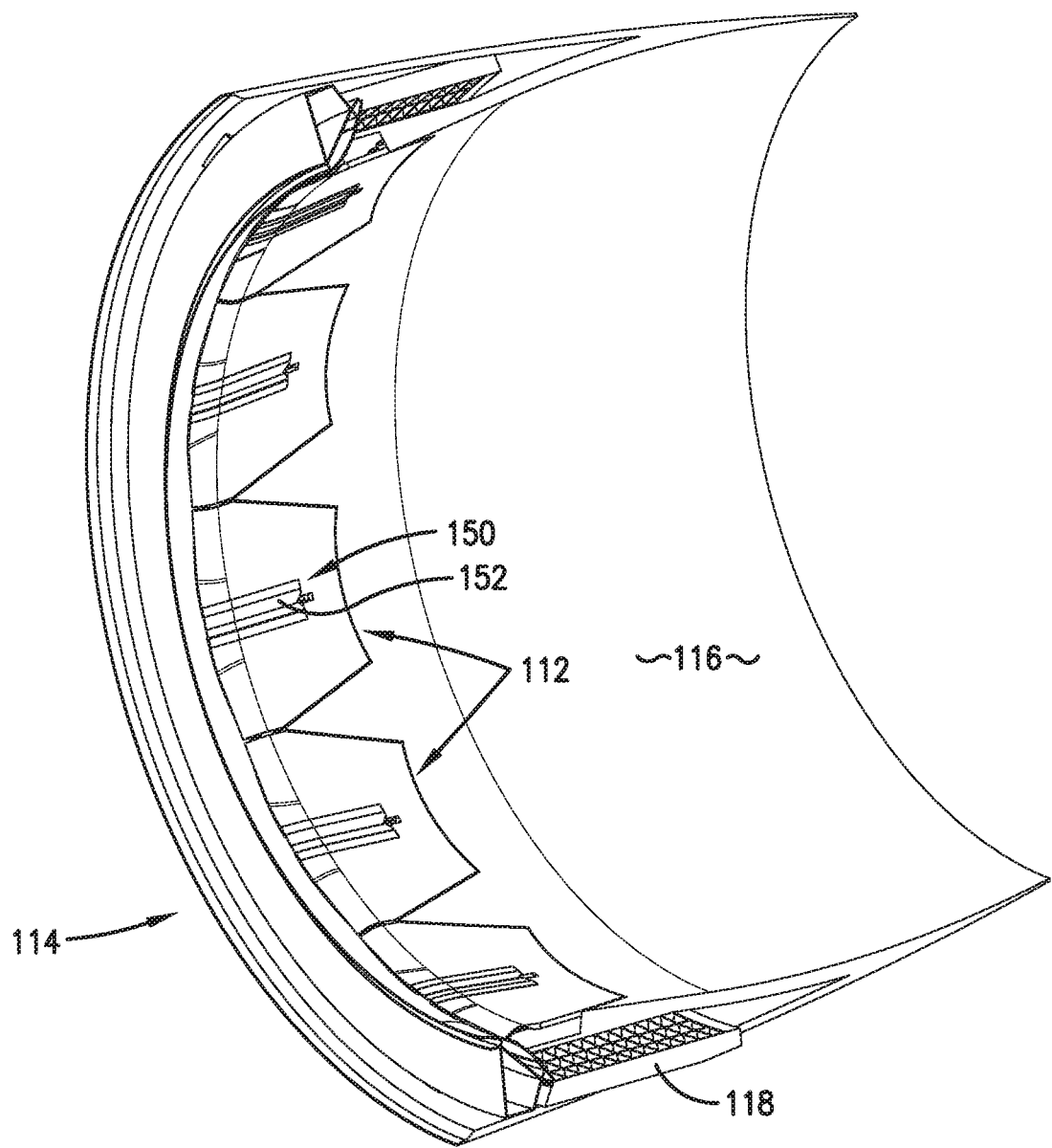
FIG. 13 is a fragmentary cross-sectional isometric view of a portion of the translating sleeve thrust reverser incorporating the system of FIG. 3 looking aft, wherein the sleeve is shown in the stowed position and the blocker door is shown in the closed position.
Figure 14:
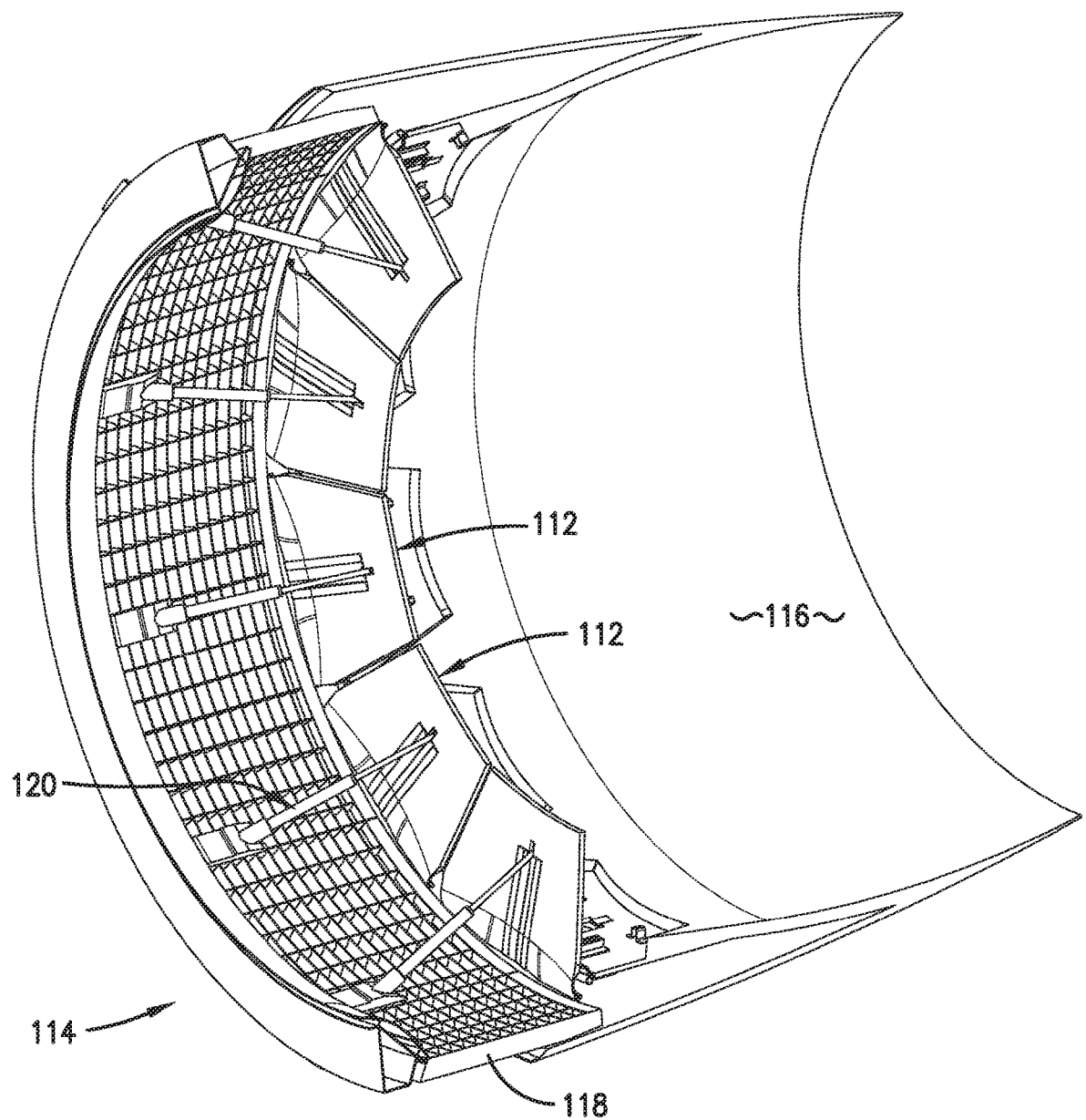
FIG. 14 is a fragmentary cross-sectional isometric view of the portion of the translating sleeve thrust reverser of FIG. 13 looking aft, wherein the sleeve is shown in the deployed position and the blocker door is shown in the open position.
Figure 15:
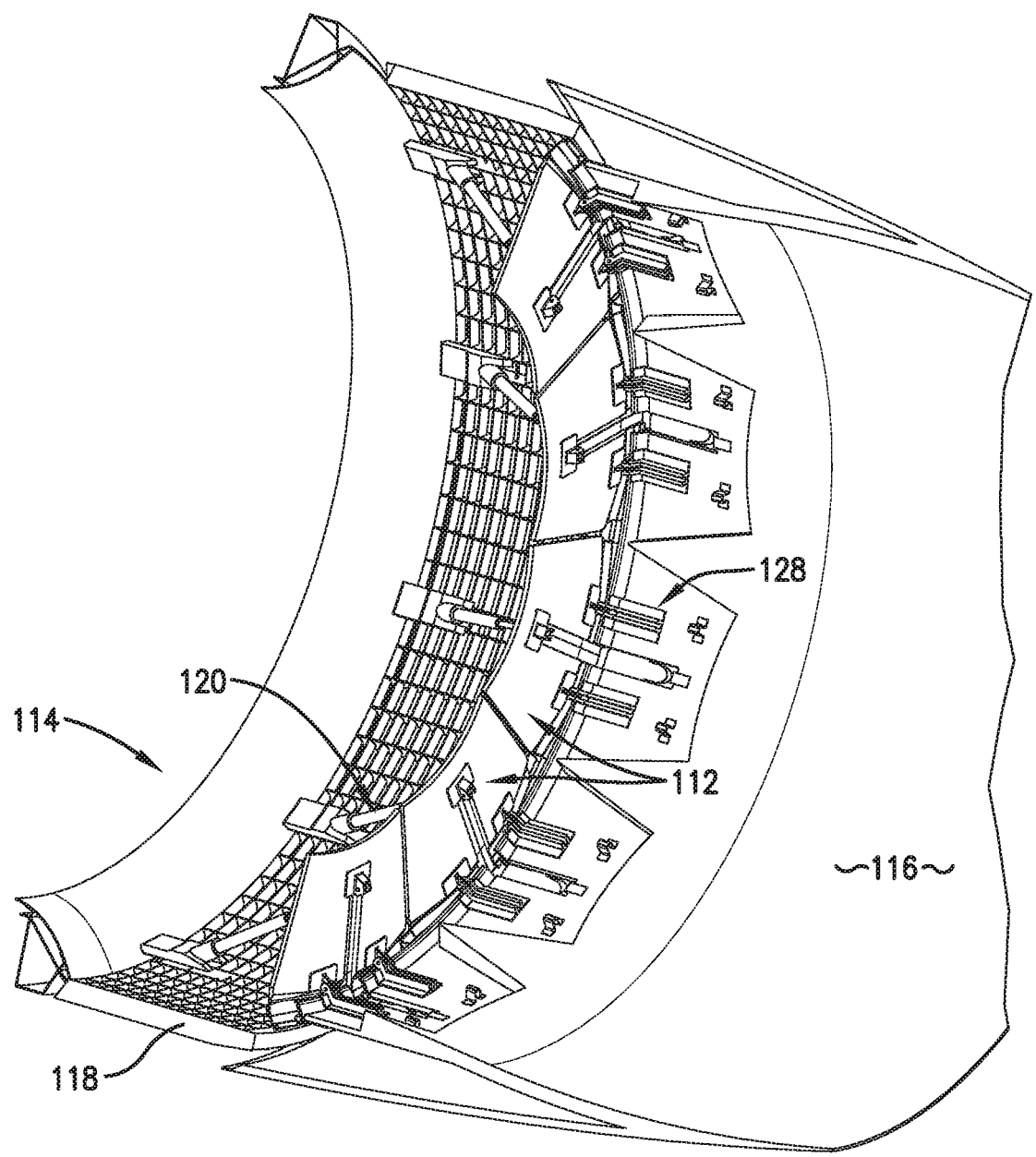
FIG. 15 is a fragmentary cross-sectional isometric view of the portion of the translating sleeve thrust reverser of FIG. 14 looking forward.

As seen in FIGS. 3-8 and 13-15, during deployment of the thrust reverser 114, actuators mounted to the torque box may translate the sleeve 116 rearward from the stowed to the deployed positions. As the sleeve 116 moves rearward, the hinges 128 mounted to the sleeve 116 pull the blocker door 112 rearward. The drag link 122 may telescopically extend while rotating in the first direction to remain in line with the blocker door 112, and then the drag link 122 may contact the stop element 144 which forces the drag link 122 to rotate in the opposite second direction to allow for continued translation of the sleeve 116. As the drag link 122 continues to telescopically extend while rotating in the second direction, the blocker door 112 rotates into the open position.

During stowage of the thrust reverser 114, the actuators mounted to the torque box may translate the sleeve 116 forward from the deployed to the stowed positions. As the sleeve 116 moves, the hinges 128 mounted to the sleeve 116 pull the blocker door 112 forward. The drag link 122 may telescopically collapse while rotating in the first direction to remain in line with the blocker door 112, and then the drag link 122 may contact the stop element 144 which causes the drag link 122 to rotate in the opposite second direction to allow for continued translation of the sleeve 116. As the drag link 122 continues to telescopically collapse while rotating in the second direction, the blocker door 112 rotates into the closed position.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for actuating a blocker door of a thrust reverser, the thrust reverser including a sleeve translatable between a stowed position in which an engine airflow is directed rearwardly and a deployed position in which the engine airflow is redirected forwardly, the system comprising:
    a blocker door moveable between a closed position associated with the stowed position of the sleeve and an open position associated with the deployed position of the sleeve and in which the engine airflow is redirected laterally by the blocker door; and
    a drag link assembly located between the sleeve in the stowed position and the blocker door in the closed position and configured to mechanically couple the sleeve to the blocker door so that translation of the sleeve to the deployed position moves the blocker door to the open position and translation of the sleeve to the stowed position moves the blocker door to the closed position, the drag link assembly including—
        a drag link including a base section and a subsequent section collapsibly and extendably connected to the base section, with the base section including a first link end, and the subsequent section including a second link end rotatably coupled with the blocker door, and
        a drag link anchor, with the first link end of the drag link rotatably coupled with the drag link anchor, the drag link anchor including a stop element which limits the rotation of the drag link about the drag link anchor,
    wherein during deployment of the sleeve, the sleeve is translated aft to the deployed position, the blocker door is pulled rearward, the drag link extends while rotating in the first direction until the drag link contacts the stop element which causes the drag link to rotate in a second direction to allow for continued translation of the sleeve, and as the drag link continues to extend while rotating in the second direction, the blocker door rotates into the open position, and
    wherein during stowage of the sleeve, the sleeve is translated forward to the stowed position, the blocker door is pulled forward, the drag link collapses while rotating in the second direction until the drag link contacts the stop element which causes the drag link to rotate in the first direction to allow for continued translation of the sleeve, and as the drag link continues to collapse while rotating in the first direction, the blocker door rotates into the closed position.

2. The system of claim 1, wherein the blocker door includes a channel through which the drag link passes during opening and closing of the door.

3. The system of claim 2, further including a seal element configured to seal the channel when the blocker door is in the closed position.

4. The system of claim 1, wherein the base section and the subsequent section of the drag link are telescopically arranged such that the subsequent section is collapsed and received within the base section when the blocker door is in the closed position and the subsequent section is extended and projecting from the base section when the blocker door is in the open position.

5. The system of claim 1, wherein a fully extended length of the drag link is between two and four times a fully collapsed length of the drag link.

6. The system of claim 1, wherein the subsequent section of the drag link is coated with a non-abrasive coating.

7. The system of claim 1, wherein one or more of the base section and subsequent section of the drag link include a bumper.

8. The system of claim 1, wherein the drag link anchor includes a spring element configured to exert a force on the drag link which urges the drag link to rotate.

9. A system for actuating a blocker door of a translating sleeve thrust reverser, the system comprising:
    a sleeve translatable between a stowed position in which an engine airflow is directed rearwardly and a deployed position in which the engine airflow is redirected forwardly;
    a blocker door hingedly coupled with the sleeve and moveable between a closed position associated with the stowed position of the sleeve and an open position associated with the deployed position of the sleeve and in which the engine airflow is redirected laterally by the blocker door; and
    a drag link assembly located between the sleeve in the stowed position and the blocker door in the closed position and configured to mechanically couple the sleeve to the blocker door so that translation of the sleeve to the deployed position moves the blocker door to the open position and translation of the sleeve to the stowed position moves the blocker door to the closed position, the drag link assembly including—
        a telescoping drag link including a base section and a subsequent section telescopically connected to the base section, with the base section including a first link end, and the subsequent section including a second link end rotatably coupled with the blocker door, and
        a drag link anchor, with the first link end of the drag link rotatably coupled with the drag link anchor,
    wherein during deployment of the translating sleeve thrust reverser, the sleeve is translated aft to
    the deployed position, the blocker door is pulled rearward with the sleeve, the telescoping drag link extends while initially rotating in a first direction and then rotating in a second direction to allow for continued translation of the sleeve, and as the telescoping drag link continues to extend while rotating in the second direction, the blocker door rotates into the open position, and
    wherein during stowage of the translating sleeve thrust reverser, the sleeve is translated forward to the stowed position, the blocker door is pulled forward with the sleeve, the telescoping drag link collapses while initially rotating in the second direction and then rotating in the first direction to allow for continued translation of the sleeve, and as the telescoping drag link continues to collapse while rotating in the first direction, the blocker door rotates into the closed position.

10. The system of claim 9, wherein the blocker door includes a channel through which the telescoping drag link passes during opening and closing of the door.

11. The system of claim 10, further including a seal element configured to seal the channel when the blocker door is in the closed position.

12. The system of claim 9, wherein a fully extended length of the telescoping drag link is between two and four times a fully collapsed length of the drag link.

13. The system of claim 9, wherein the subsequent section of the telescoping drag link is coated with a non-abrasive coating.

14. The system of claim 9, wherein one or more of the base section and subsequent section of the telescoping drag link include a bumper.

15. The system of claim 9, wherein the drag link anchor includes a spring element configured to exert a force on the telescoping drag link which urges the telescoping drag link to rotate.

16. A system for actuating a blocker door of a translating sleeve thrust reverser, the system comprising:
  a sleeve translatable between a stowed position in which an engine airflow is directed rearwardly and a deployed position in which the engine airflow is redirected forwardly;
  a blocker door hingedly coupled with the sleeve and moveable between a closed position associated with the stowed position of the sleeve and an open position associated with the deployed position of the sleeve and in which the engine airflow is redirected laterally by the blocker door; and
  a drag link assembly located between the sleeve in the stowed position and the blocker door in the closed position and configured to mechanically couple the sleeve to the blocker door so that translation of the sleeve to the deployed position moves the blocker door to the open position and translation of the sleeve to the stowed position moves the blocker door to the closed position, the drag link assembly including—
    a telescoping drag link including a base section and a subsequent section telescopically connected to the base section, with the base section including a first link end, and the subsequent section including a second link end rotatably coupled with the blocker door, and
    a drag link anchor, with the first link end of the drag link rotatably coupled with the drag link anchor, the drag link anchor including a stop element which limits the rotation of the drag link about the drag link anchor,
  wherein during deployment of the translating sleeve thrust reverser, the sleeve is translated aft to the deployed position, the blocker door is pulled rearward with the sleeve, the telescoping drag link extends while rotating in the first direction until the telescoping drag link contacts the stop element which causes the drag link to rotate in a second direction to allow for continued translation of the sleeve, and as the telescoping drag link continues to extend while rotating in the second direction, the blocker door rotates into the open position, and
  wherein during stowage of the translating sleeve thrust reverser, the sleeve is translated forward to the stowed position, the blocker door is pulled forward with the sleeve, the telescoping drag link collapses while rotating in the second direction until the telescoping drag link contacts the stop element which causes the telescoping drag link to rotate in the first direction to allow for continued translation of the sleeve, and as the telescoping drag link continues to collapse while rotating in the first direction, the blocker door rotates into the closed position.

17. The system of claim 16, wherein the blocker door includes a channel through which the telescoping drag link passes during opening and closing of the door.

18. The system of claim 17, further including a seal element configured to seal the channel when the blocker door is in the closed position.

19. The system of claim 16, wherein a fully extended length of the telescoping drag link is between two and four times a fully collapsed length of the drag link.

20. The system of claim 16, wherein the drag link anchor includes a spring element configured to exert a force on the telescoping drag link which urges the telescoping drag link to rotate.

* * * * *